BOUNDARY-DISPLACEMENT MAGNETIC RECORDING OR REPRODUCING HEAD

Filed June 1, 1960

Inventors
Saburo Uemura
Moriji Handa
by Hill, Sherman, Meroni, Gross & Simpson Attys.

3,147,347

BOUNDARY-DISPLACEMENT MAGNETIC RECORDING OR REPRODUCING HEAD

Saburo Uemura and Moriji Handa, Tokyo, Japan, assignors to Sony Corporation, Tokyo, Japan, a corporation of Japan Filed June 1, 1960, Ser. No. 33,163
Claims priority, application Japan June 3, 1959
4 Claims. (Cl. 179—100.2)

This invention relates to improvements in a boundary-displacement magnetic recording or reproducing head and more particularly to such a magnetic head having linearity of recording.

It is the principal object of this invention to provide a boundary-displacement magnetic recording or reproducing head which is adapted for boundary-displacement magnetic recording and reproducing owing to its linearity of magnetic field.

It is another object of this invention to provide a boundary displacement magnetic recording or reproducing head which is simple in construction.

Other objects, features and advantages of this invention will become apparent from the following detailed description taken in connection with the accompanying drawing, in which FIGURE 1 is an enlarged plan view of an original form of a boundary-displacement magnetic head.

FIGURE 2 is an enlarged plan view of a boundary-displacement magnetic head, by way of example, according to this invention.

FIGURES 3A, B and C illustrate front views of various forms of D.C. magnets used in this invention, and FIGURE 4 shows a curve of magnetic flux density as a function of location along the air gap of a magnetic head according to this invention as compared with a similar curve of a magentic head of the original form.

Before entering into the description of this invention, we will explain an original form of a boundary-displacement magnetic head in connection with FIGURE 1.

The magnetic head is provided with a D.C. magnetic apparatus M composed of an oblong permanent magnet $1_a$ and a magnetic core $1_b$ attached thereto, another magnetic core 2 which is arranged oppositely to the magnetic core $1_b$ with an air gap *g* and a signal energized coil 3 wound on the magnetic core 2. Such a magnetic head is arranged to contact a magnetic tape T which travels in the perpendicular direction with respect to the air gap *g* as indicated by arrow 4, FIGURE 1.

In this case the tape is magnetized in such a manner that the half parts separated by the center line O—O are magnetized in the opposite polarity and the boundary-displacement magnetic recording is performed according to a wave form of a signal by which the coil 3 is energized.

In the above operation, D.C. magnetic flux which is established by the D.C. magnetic apparatus M and given to the core $1_b$ therefrom will flow to the core 2 through the air gap. The permanent magnet $1_a$ has an oblong shape as shown in FIGURE 1 and the flux is applied to the core $1_b$ from both ends of the magnet. The direction of magnetization of magnet M is indicated by arrow 5, and the nature of the flux path through cores $1_b$ and 2 is indicated by arrows 6, 7 and 8 in FIGURE 1.

In general, an equal flux density is required in every part of the core $1_b$ to obtain a good result in boundary-displacement magnetic recording. By the oblong magnet $1_a$ shown in FIGURE 1, however, the magnetic flux passing through the air gap *g* is comparatively greater at the outer sides thereof and will gradually decrease towards the center of the air gap. Accordingly, the variation of flux density B as a function of the distance *x* from the center C of the axis X—X at the air gap will be non-linear as indicated by curve *a* in FIGURE 4. For this reason, the linearity of the change of flux density with respect to the D.C. neutral position of the magnetic head, when the head moves in the direction perpendicular to the longitudinal direction of the tape, is disturbed and accordingly faithful boundary-displacement magnetic recording cannot be attained.

In accordance with this invention, considering the above described disadvantage, a magnetic head is so made that the flux density at the air gap *g* varies linearly as shown by a curve *b* in FIGURE 4. To this end, the D.C. magnet $1_a$ has one or more of its sides effectively of a convex contour.

This shape is considered to be a magnet which is constructed by laminating a plurality of plate-like oblong permanent magnets having different lengths, as shown in FIGURE 3A, each individual magnet being symmetrical with respect to center line O—O, and the magnets being of such lengths that the flux distribution in the gap will be linear and can be illustrated by the curve *b* in FIGURE 4.

FIGURE 3B shows another example of this invention in which the magnet has convex contours at both sides thereof, while FIGURE 3A shows the magnet having the convex contour at one side.

FIGURE 3C shows a further example of this invention in which the magnet is constructed by combining a plurality of magnet pieces S in a stepped relationship so as to form a convexly shaped magnet similar in overall contour to the magnet shown in FIGURE 3B.

Thus, according to this invention the D.C. magnet of the magnetic head is so shaped that linearity can be obtained in the boundary displacement recording of signals. Accordingly, the magnetic head of this invention has the advantage that a distortion which is apt to occur at the ends of the head is avoided to obtain linear and faithful boundary-displacement magnetic recording of signals.

Figure 1:
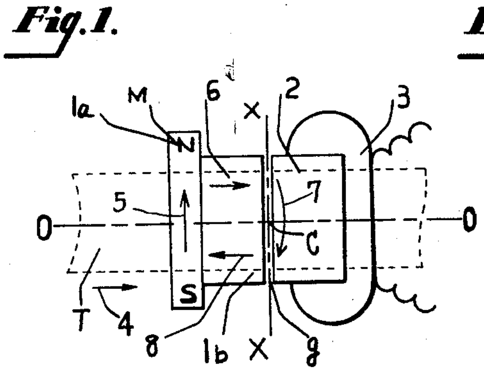
Figure 2:
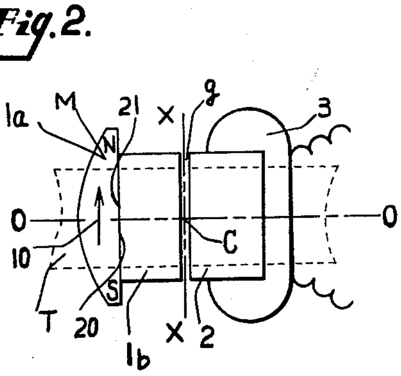
Figure 3:
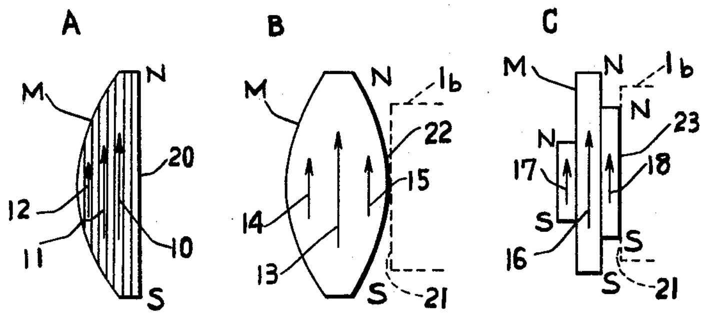
Figure 4:
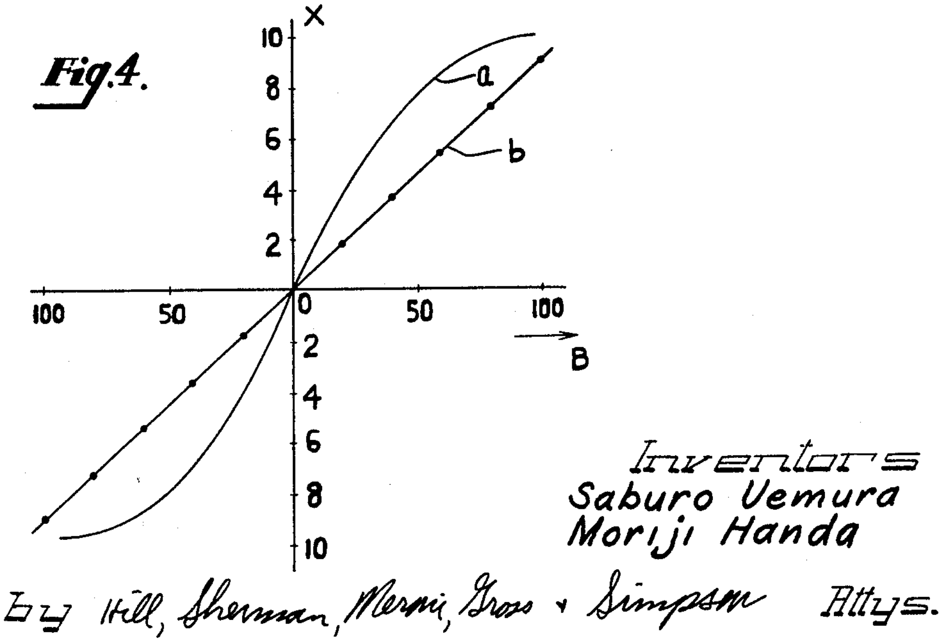

The arrows 10, 11 and 12 in FIGURE 3A; 13, 14 and 15 in FIGURE 3B; and 16, 17 and 18 in FIGURE 3C indicate the direction of magnetization of representative portions of the respective magnets. Cores $1_b$ and 2 may have confronting C shapes with magnet M engaging the flat vertical surface 21 of the vertical leg of core $1_b$ and having a uniform horizontal cross section throughout its height. The top surface of magnet M visible in FIGURE 2 may be spaced below the level of tape T.

As shown in FIGURE 2, side 20 of the magnet M of FIGURE 3A engages flatwise with a flat surface 21 of core $1_b$. In FIGURE 3B, convex surface 22 engages core surface 21 at its vertical center line and diverges from the core surface 21 at each side of the center line.

In the embodiment of FIGURE 3C, surface 23 of magnet M engages flatwise with surface 21 of core $1_b$.

While we have explained a particular embodiment of our invention, it will be understood, of course, that we do not wish to be limited thereto since many modifications may be made and we, therefore contemplate by the appended claims to cover any such modifications as fall within the spirit and scope of our invention.

What is claimed is:

1. A boundary-displacement magnetic recording and reproducing head comprising:

(*a*) a permanent magnet, (*b*) a first magnetic core part in coupling relation to said permanent magnet for energization thereby, (*c*) a second magnetic core part arranged oppositely to said first magnetic core part to form a non-magnetic gap therebetween for coupling to a magnetic record medium travelling successively across said magnetic core parts, (*d*) said non-magnetic gap having a length dimension corresponding to the distance between said first and second core parts at said gap and having a width dimension corresponding to the width dimensions of said core parts at said gap, (*e*) a signal coil coupled to said second magnetic core part, (*f*) said permanent magnet being magnetized in a direction extending generally parallel to the width dimension of said gap and having a central portion in alignment with respect to a direction parallel to the length dimension of said gap with a central portion of the width dimension of said gap and having outer portions in alignment with respect to a direction parallel to the length dimension of said gap with respective outer portions of the width dimension of said gap on respective opposite sides of said central portion of said gap, and (*g*) said permanent magnet having a cross section at right angles to the direction of magnetization thereof which cross section is substantially greater at said central portion of said permanent magnet than at each of said outer portions of said permanent magnet and which cross section varies in the direction of magnetization of said permanent magnet so that said permanent magnet produces a magnetic flux density at said gap having a magnitude which is equal to zero at said central portion of said gap and which increases linearly from said central portion of said gap to each of said outer portions of said gap.

2. The head of claim 1 further characterized by:

(*h*) said permanent magnet having a flat lateral surface extending parallel to said direction of magnetization and engaging flatwise with said first core part and having an opposite lateral surface remote from said first core part which is convex and provides the substantially greater cross section of said central portion of said permanent magnet.

3. The head of claim 1 further characterized by:

(*h*) said permanent magnet having opposite lateral surfaces extending generally parallel to the direction of magnetization and of oppositely directed convex contour to provide the substantially greater cross section of said central portion of said permanent magnet.

4. The head of claim 1 further characterized by:

(*h*) said permanent magnet being formed of a plurality of magnet units of constant cross section but of different lengths in said direction of magnetization.

References Cited in the file of this patent

UNITED STATES PATENTS

| | | |
|---|---|---|
| 2,822,427 | Atkinson et al. | Feb. 4, 1958 |
| 2,995,632 | Daniels | Aug. 8, 1961 |

FOREIGN PATENTS

| | | |
|---|---|---|
| 1,026,974 | Germany | Mar. 27, 1958 |
| 823,157 | Great Britain | Nov. 4, 1959 |
| 61,499 | France | Nov. 17, 1954 |
| 1,154,314 | France | Oct. 28, 1957 |
| 1,215,592 | France | Nov. 23, 1959 |